United States Patent [19]

Roberts

[11] 4,409,840

[45] Oct. 18, 1983

[54] VIBRATING VANE PRESSURE GAUGE

[75] Inventor: Griffith T. Roberts, Llantrisant, Wales

[73] Assignee: National Research Development Corporation, London, England

[21] Appl. No.: 361,255

[22] Filed: Mar. 24, 1982

[30] Foreign Application Priority Data

Mar. 30, 1981 [GB] United Kingdom ............... 8109823

[51] Int. Cl.³ .............................................. G01L 9/12
[52] U.S. Cl. .................................................... 73/704
[58] Field of Search ................................. 73/704, 702

[56] References Cited

U.S. PATENT DOCUMENTS 2,466,809  4/1949  Hobbs ................................... 73/702

OTHER PUBLICATIONS

Anderson, The Review of Scientific Instruments, vol. 29 No. 12, Pressure gauge for Corrosive Gases in the Micron and Submicron Region, Dec. 1958, pp. 1073–1078.

Jones & Roberts, A Vibrating Vane Gauge for Pressure Measurement vol. 28, No. 1, Jul. 1977, pp. 13–16.

Robert, The Theories of Oscillating-Vane and Rotating-Disk Pressure Gauges, vol. 3, Mar. 1970, pp. 806–810.

Primary Examiner—Donald O. Woodiel
Attorney, Agent, or Firm—Cushman, Darby & Cushman

[57] ABSTRACT

In a vibrating vane pressure gauge in which a plane metal vane is vibrated in an enclosure of only slightly larger area than the vane and the decay of the vibration (which is proportional to gas pressure) is sensed, the vane is provided with at least one lip along an edge of the vane.

8 Claims, 7 Drawing Figures

VIBRATING VANE PRESSURE GAUGE

This invention relates to the measurement of the pressure of a gas or vapour atmosphere by connecting an enclosure to the atmosphere, causing a cantilevered vane to vibrate in the enclosure, and sensing the decay of the vibration; the decay is partly caused by the collision of gas molecules with the vane. The theory of operation of such a device is described by the present inventor in J. Phys. E. 3 1970 pp 806 to 810 in a paper entitled "The theories of oscillating-vane and rotating-disk pressure gauges". The paper predicts theoretically that causing the vane to vibrate in a chamber having a cross sectional area only slightly larger than the area of the vane, so that clearance around the edges of the vane are very small, would be advantageous. In a paper written jointly with G. Jones in Vacuum, 28 No. 1, 1977 pp 13 to 16, the experimental confirmation of this prediction is reported.

In the present specification, further advantageous modifications are disclosed.

According to the invention a vibrating vane pressure gauge comprises a planar vane of electrically conductive material supported by vibration-permitting support means and having at least one electrically conductive extension extending away from the vane across a substantial length of the vane;

an enclosure in which the vane can vibrate perpendicular to its plane, the distances in the plane of the vane between the vane edges and the enclosure being small in comparison with the vane dimensions;

connecting means for connecting the enclosure to a gas or vapour atmosphere;

vibration means for vibrating the vane;

and sensing means for sensing the decay of the vibration when the vibration means is deactivated.

The electrically conductive extension may be a lip along at least one edge of the vane, and the vibration-permitting support may be a cantilever Preferably the arrangement is such that the distances in the directions away from the plane of the vane between each surface of the vane at its rest position and the adjacent walls of the enclosure are less than half the length of the vane.

Also according to the invention, a method of sensing the pressure of a gas or vapour atmosphere comprises supporting by vibration-permitting support means a planar vane of electrically conductive material which has at least one electrically conductive extension extending away from its plane across a substantial length of the vane; surrounding the vane by an enclosure such that the distances in the plane of the vane between the vane edges and the enclosure are small in comparison with the vane dimensions; connecting the enclosure to the gas or vapour atmosphere; causing the vane to vibrate perpendicular to its plane; and sensing the decay of the vibration.

The invention will now be described by way of example with reference to the accompanying drawings in which.

Figure 5:
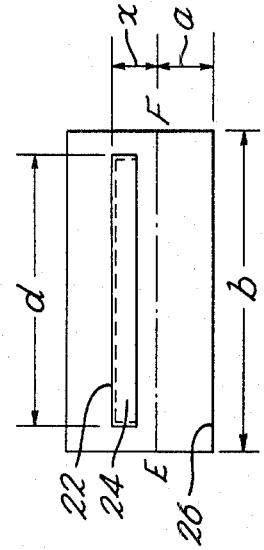

FIG. 5 indicates the relative dimensions of the vane and the enclosure.

Figure 6:
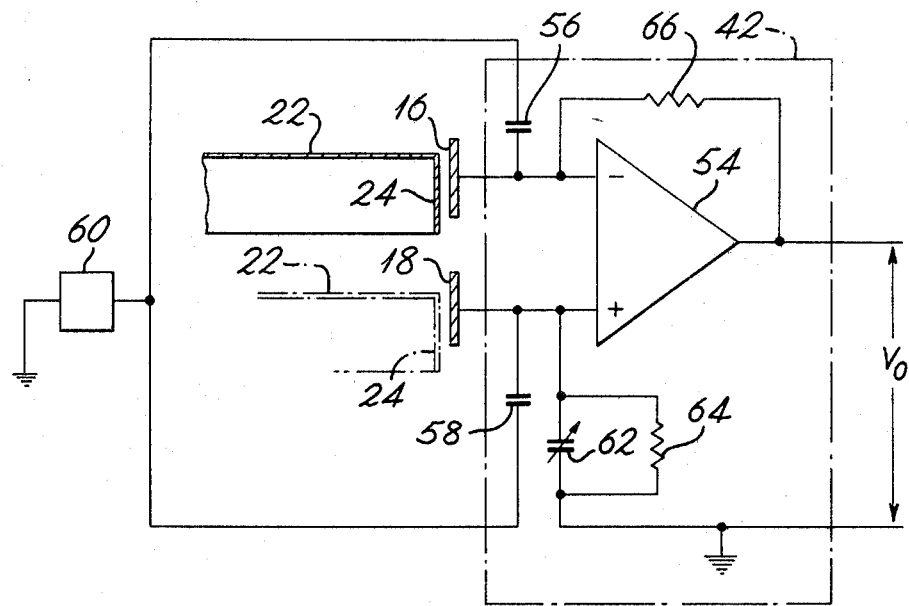

FIG. 6 illustrates the arrangement for sensing the vibration of the vane; and

Figure 7:
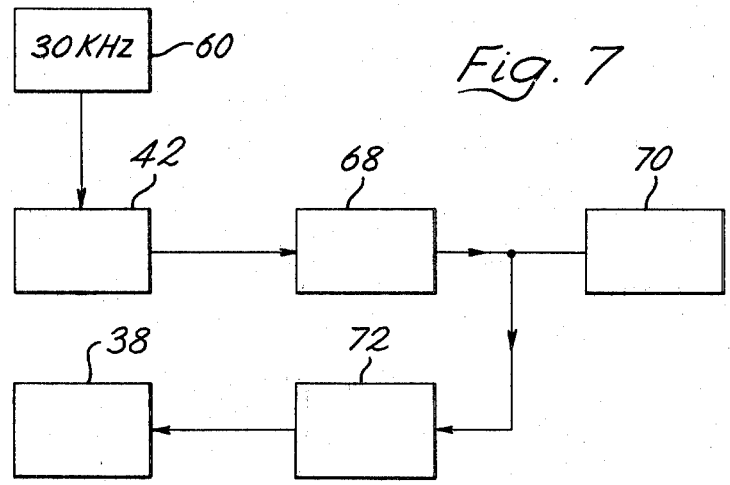

FIG. 7 is a schematic diagram of the electronic circuit.

Figure 1:
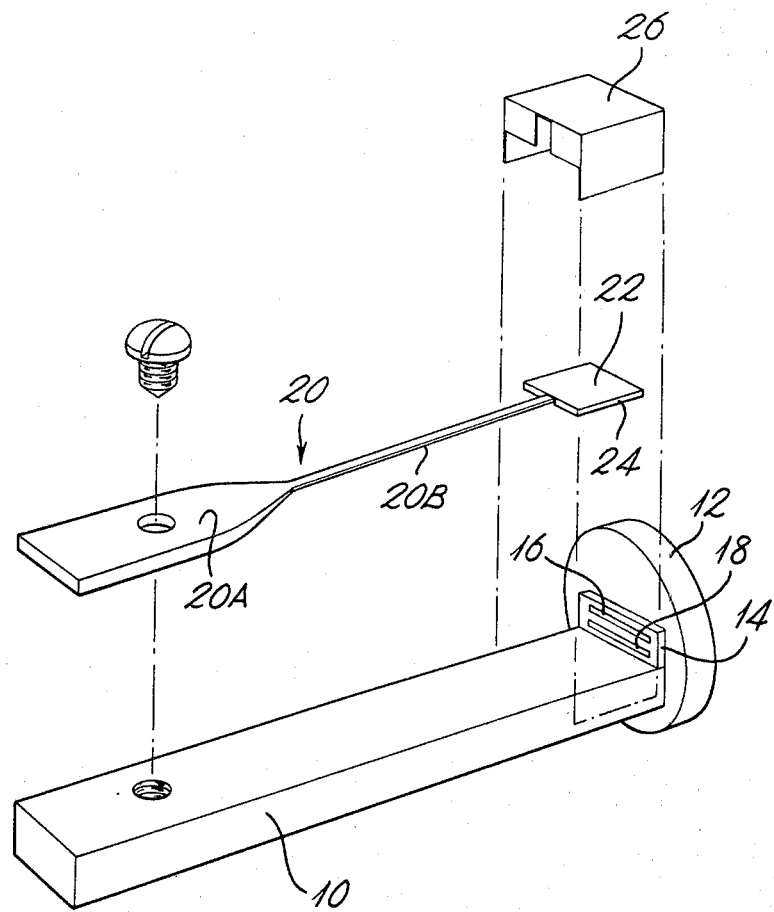
FIG. 1 is an exploded view of part of a vibrating vane pressure gauge according to the invention.
Figure 2:
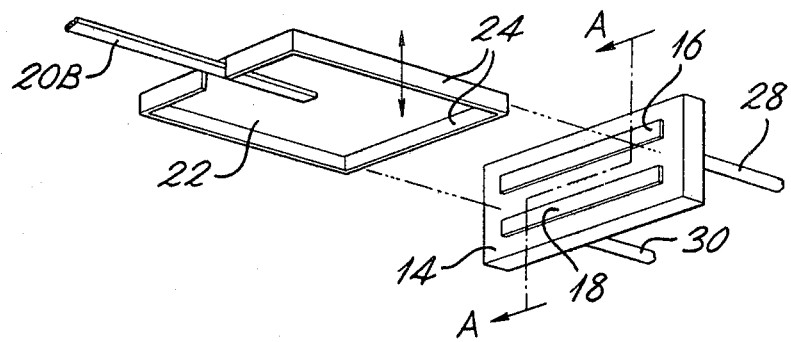
FIG. 2 is an enlarged view of the vane and adjacent sensing device.

In FIG. 1 a rectangular stainless steel support bar 10 carries at one end a transverse circular stainless steel endplate 12. The endplate carries a ceramic electrode support 14 on its surface facing towards the bar 10, the support 14 having two horizontal strip electrodes 16, 18. A ferritic, i.e. magnetic, stainless steel cantilever 20 is bolted at its thick end 20A to the bar remote from the endplate 12, and a slender second end 20B of the cantilever extends towards the ceramic support 14 and carries a plane square austenitic stainless steel vane 22, the vane is soldered to the cantilever. The vane carries narrow stainless steel lips 24 along all four edges at right angles to the plane of the vane; the lips can be seen more clearly in FIG. 2. The lip nearest the ceramic support 14 is parallel to the strip electrodes 16, 18.

Referring again to FIG. 1, the vane 22 is surrounded by a vane enclosure 26 made from stainless steel foil and spot welded to the bar 10.

Figure 3:
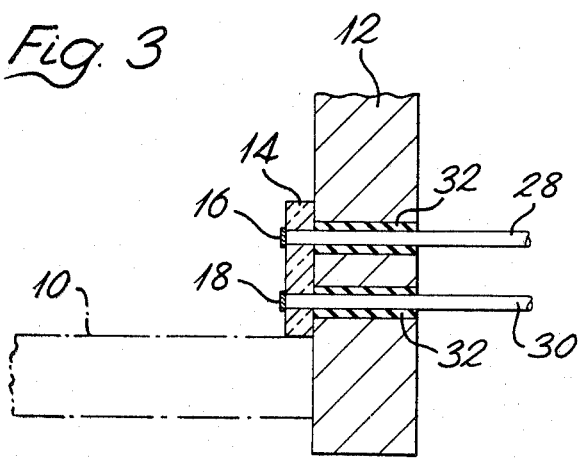
FIG. 3 is a section A—A through the sensing device of FIG. 2.

FIG. 3 shows in section the bar 10, endplate 12, and ceramic support 14. The electrodes 16, 18 are connected to wires 28, 30 which pass through the endplate 12 in insulating jackets 32.

Figure 4:
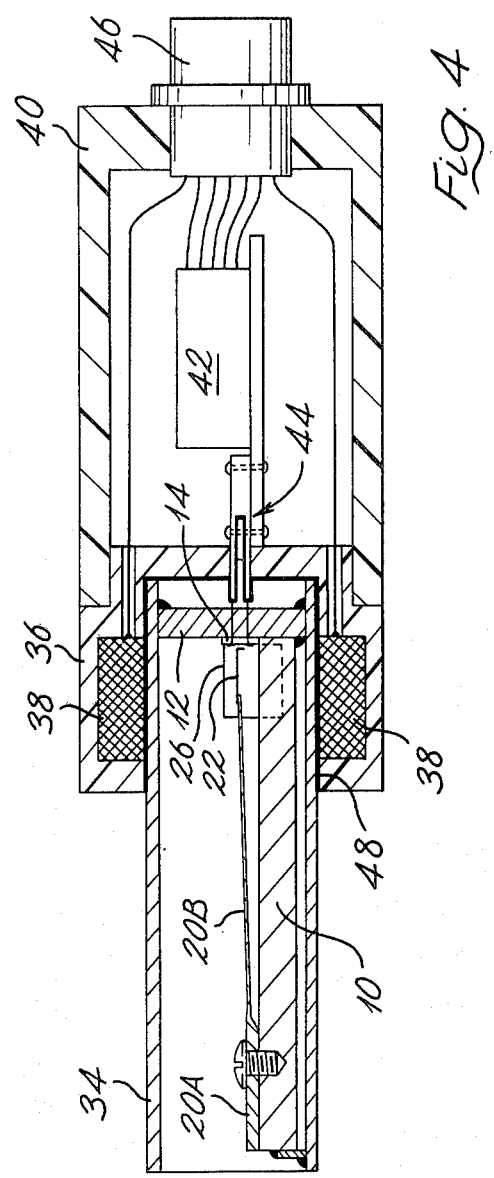
FIG. 4 is a section through the assembled pressure gauge.

FIG. 4 illustrates in vertical section the gauge as assembled. The support bar 10 etc are enclosed by a stainless steel tube 34; the end of the tube 34 around the endplate 14 is surrounded by a driving coil housing 36, with magnetic driving coils 38 positioned above and below the vane 22. The coil housing 36 is attached to an amplifier housing 40 which encloses an amplifier circuit 42 to which the wire lead throughs 28, 30 (FIG. 3) are connected through a socket 44. The circuit 42 is connected at its end remote from the socket 44 to a multiway plug 46 to which the driving coils 38 are also connected.

The tube 34 containing the support bar 10, endplate 14 etc can be separated from the housings 36, 40 as indicated by the heavy line 48, to allow the mechanical parts to be cleaned by heating.

The vane 22 and vane enclosure 26 etc can be exposed to a low pressure atmosphere under test or a vacuum system through an end fitting (not shown).

In use the magnetic coils 38 are supplied with a signal typically within the range 70 to 90 Hz or 130 to 150 Hz, so that the cantilever 20 vibrates and the vane 22 is caused to vibrate at this frequency in the enclosure 26 in a direction perpendicular to its plane. When the signal supply is switched off, the decay time of the vibrations is a measure of the pressure of gas in the enclosure 26. The relationship is given by:

$$A = A_0 e^{-\beta t} \tag{1}$$

where $A_o$ is amplitude at time $t = o$,
$A$ is amplitude at time $t = t$,
and $\beta$ is the damping constant.

Also $\beta = \beta_G + \beta_I$ (2)

where $\beta_G$ is the damping factor due to gas molecule collisions with the vane and $\beta_I$ is the damping factor due to dissipation of energy in the cantilever. It is possible to keep $\beta_I$ constant by careful design of the cantilever and support. It has also been shown that when the mean free path of gas molecules is longer than the length of the vane enclosure, then:

$$\beta_G = \left(\frac{2}{\pi}\right)^{\frac{1}{2}} \left(3 + \frac{\pi^2}{f}\right) P \left(\frac{M}{RT}\right)^{\frac{1}{2}} \psi \qquad (3)$$

where f is a function dependent on the ratio of the dimensions of the vibrating vane to the dimensions of the enclosure; P is the gas pressure; M is the gas molecular weight; T is the gas temperature; R is the gas constant; and $\psi$ is a function dependent on cantilever dimensions and the mass of the vane. Thus if $\beta_1$ is constant the damping factor is proportional to the gas pressure, provided the mean free path of the gas molecules is greater than the dimensions of the gauge.

In many prior art devices $f > 100$, thus $(3 + \pi^2/f) \Omega 3$. When the area of the vane and the area of the enclosure are approximately equal, f can be as low as 0.34, when $(3 + \pi^2/f) \Omega 32$.

Referring now to FIG. 5, the vane 22 of length d is shown inside the enclosure 26 of length b. The height of the enclosure perpendicular to the vane area is 2a and the vane is shown displaced from the central rest position on line EF by a distance x. FIG. 5 is similar to FIG. 1 of the paper by the present inventor published in 1977 and referred to above and illustrates the known feature that it is advantageous to have d almost equal to b, so that sensitivity is increased. In accordance with the present invention, a further increase in sensitivity is achieved by the provision of the lips 24 extending transverse to the plane of the vane 22, because the conductance of the gap between vane lips 24 and the enclosure sides is decreased. Such lips are not present in the 1977 publication. Yet a further improvement in sensitivity is achieved if the enclosure dimensions are such that $2a < b$, i.e. the vane vibrates in an enclosure which at maximum vibration amplitude has small clearances in all three dimensions. With such a vane and enclosure, values of $(3 + \pi^2/f)$ as high as 40 may be achieved; the theoretical maximum is 80.

Typical dimensions are a 10.6 millimeter square vane with lips about 0.8 millimeter deep, and an enclosure which is 11.2 millimeters square and 4.5 millimeters high. The vane and lips will typically be 0.02 millimeters thick.

Equation (3) gives a linear relationship between damping and gas pressure up to pressures at which the mean free path of the gas molecules is no longer greater than the dimensions of the gauge; at such pressures, typically $10^{-1}$ torr, a change of slope occurs but the gauge can be used at these higher pressures after calibration. A gauge as described above can be used at pressures less than 1 torr; pressures as low as $2 \times 10^{-4}$ torr can be sensed, but it is then essential to use a cantilever of unitary construction is described above. At high pressures a composite cantilever is tolerable. By increasing the clearances between the vane and the enclosure, pressures up to 10 torr can be sensed.

The method of sensing the vibration decay of the vane will now be described with reference to FIG. 6 which illustrates the lip 24 of vane 22 adjacent the strip electrodes 16, 18. The vane is shown at one extreme position of its vibration, so that the lip 24 is closely adjacent electrode 16 and there is a capacitance between the electrode and the lip. At the other extreme position, shown dotted, a capacitance develops between the lip 24 and the strip electrode 18. The vane is earthed through the cantilever 20.

The electrodes 16, 18 are connected one to each input of a head amplifier 54. The electrodes are connected through matching capacitors 56, 58 to an oscillator 60 which supplies a carrier signal. The capacitors provide equal capacitances to the amplifier inputs when the vane is in its rest position, and a variable capacitor 62 and parallel resistor 64 provide a zero set. The amplifier has a feedback resistor 66. The items included in circuit 42 illustrated in FIG. 4 are enclosed by the chain dotted line. The arrangement is such that the carrier frequency is modulated as the capacitances between the electrodes 16 and 18 and the vane lip 24 vary with time. The voltage $V_o$ generated at the output of amplifier 54 is a modulated voltage, the degree of modulation being a measure of the distance of the vane 22 from its rest position.

FIG. 7 illustrates the electrical arrangement in box diagram form. The oscillator 60, typically at 30 KHz, supplies a carrier signal to the circuit 42 including the head amplifier 54, which supplies a modulated signal to a demodulator, amplifier and filter 68. The output of filter 68 is a signal proportional to the displacement of vane 22 which is supplied to a measuring and calculating unit 70 which measures the damping factor and converts the result to gas pressure for a known gas. Typically the time for the vibration of the vane to decay between two predetermined amplitudes is measured. Filter 68 is also connected to a vane drive system 72 which powers the magnetic driving coils 38.

The device may be used in any orientation so that the vane vibrates horizontally or vertically or in an intermediate direction. The vane has been shown as square, but it can take any other shape such as elliptical, circular or rectangular.

It is expected that gauges of slightly different construction will be used to operate at high accuracy each over only part of the possible pressure range, although a single gauge could measure pressures over the whole range by suitable calibration but at lower accuracy.

I claim:

1. A vibrating vane pressure gauge comprises a planar vane of electrically conductive material supported by vibration-permitting support means and having at least one electrically conductive extension extending away from the vane across a substantial length of the vane;

an enclosure in which the vane can vibrate perpendicular to its plane, the distances in the plane of the vane between the vane edges and the enclosure being small in comparison with the vane dimensions;

connecting means for connecting the enclosure to a gas or vapour atmosphere;

vibration means for vibrating the vane;

and sensing means for sensing the decay of the vibration when the vibration means is deactivated.

2. A pressure gauge according to claim 1 in which the electrically conductive extension is a lip along at least one edge of the vane.

3. A pressure gauge according to claim 1 in which the distances in the directions away from the plane of the vane between each surface of the vane at its rest position and the adjacent walls of the enclosure are less than half of the length of the vane.

4. A pressure gauge according to claim 1, in which the vane is a square, stainless steel vane and has a stainless steel lip along all four edges, the lips being at right angles to the plane of the vane.

5. A pressure gauge according to claim 1 in which the vane is supported by a metal cantilever.

6. A pressure gauge according to claim 5 in which at least one of the vane and the cantilever is made of magnetic material, and the vibration means comprises at least one magnetic coil.

7. A pressure gauge according to claim 2 which the sensing means comprises a pair of strip electrodes placed parallel to the lip along one edge of the vane, vibration of the vane causing variations in capacitances between the lip and each strip electrode, the sensing means also comprising circuit means to sense the variations in the capacitances.

8. A method of sensing the pressure of a gas or vapour atmosphere comprises supporting by vibration-permitting support means a planar vane of electrically conductive material which has at least one electrically conductive extension extending away from its plane across a substantial length of the vane; surrounding the vane by an enclosure such that the distances in the plane of the vane between the vane edges and the enclosure are small in comparison with the vane dimensions; connecting the enclosure to the gas or vapour atmosphere; causing the vane to vibrate perpendicular to its plane; and sensing the decay of the vibration.

* * * * *